Sept. 11, 1962 M. L. ABEL 3,053,421
INJECTION MACHINES FOR WICKING MATERIAL
Original Filed Oct. 14, 1957 3 Sheets-Sheet 1
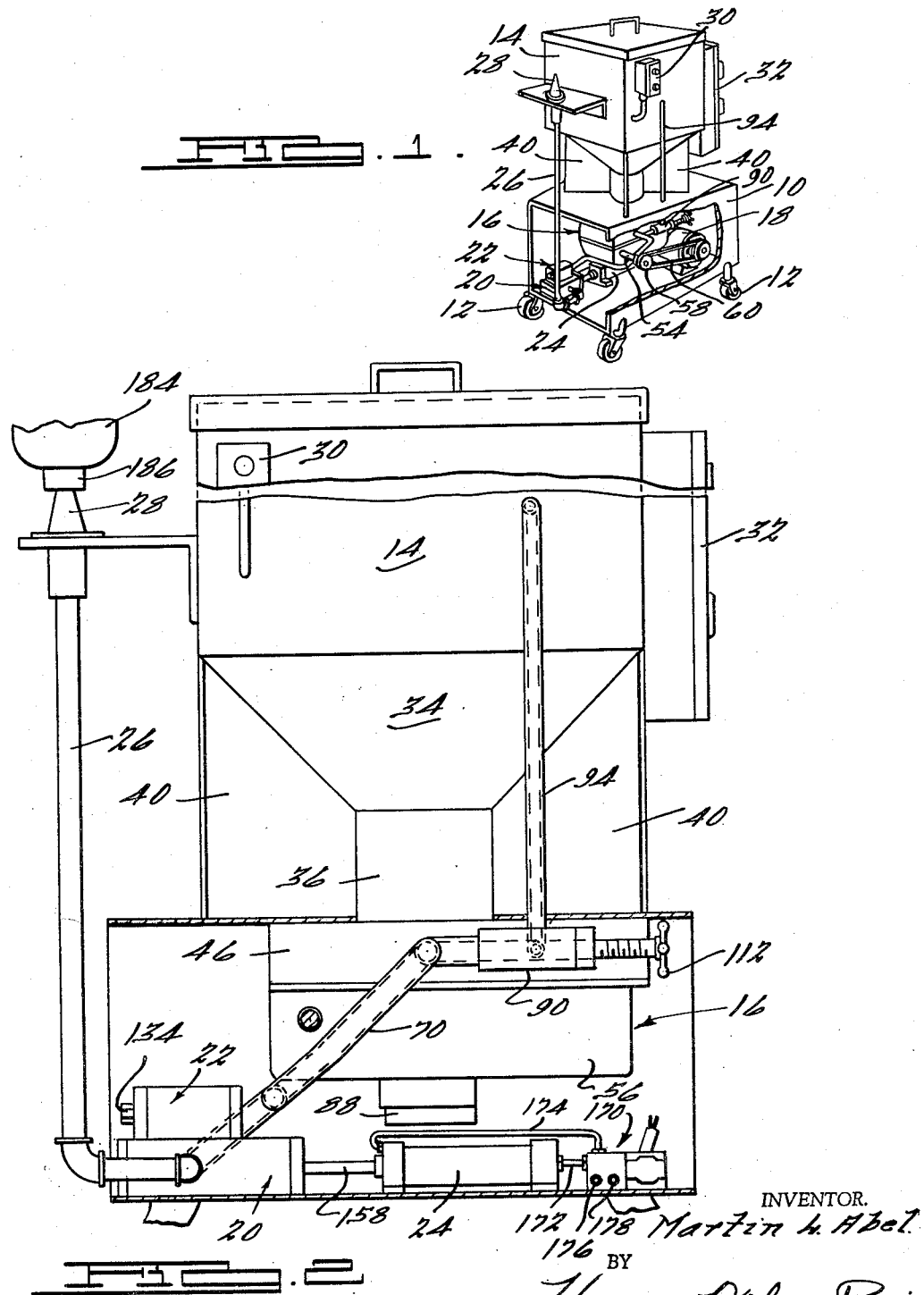

Sept. 11, 1962　　　　M. L. ABEL　　　　3,053,421
INJECTION MACHINES FOR WICKING MATERIAL
Original Filed Oct. 14, 1957　　　　3 Sheets-Sheet 2
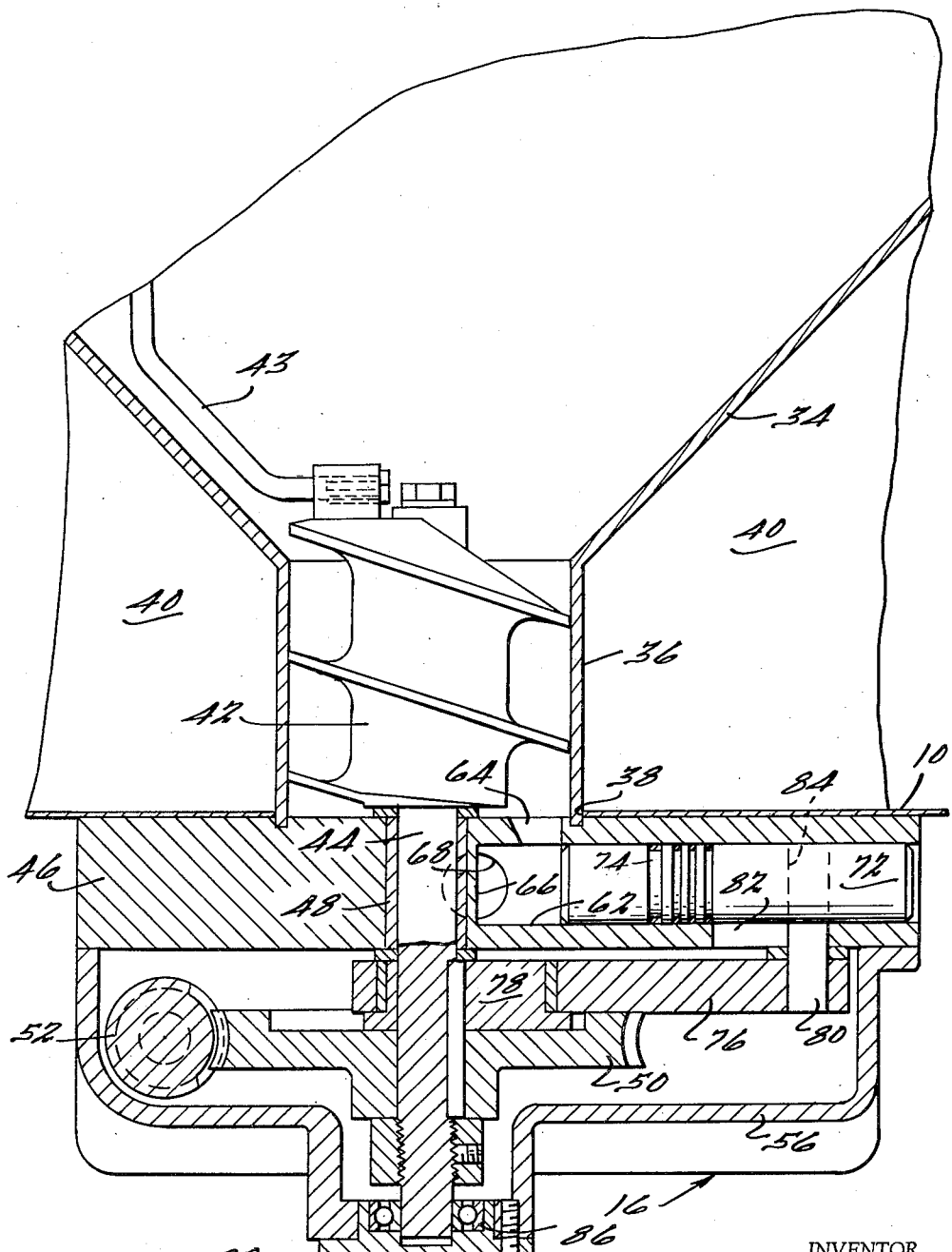
INVENTOR.
Martin L. Abel.
BY
Harness, Dickey & Pierce
ATTORNEYS

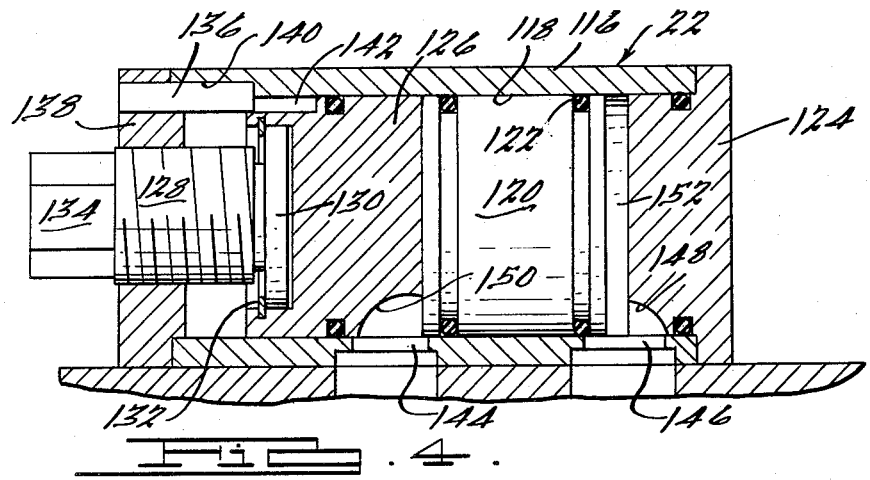
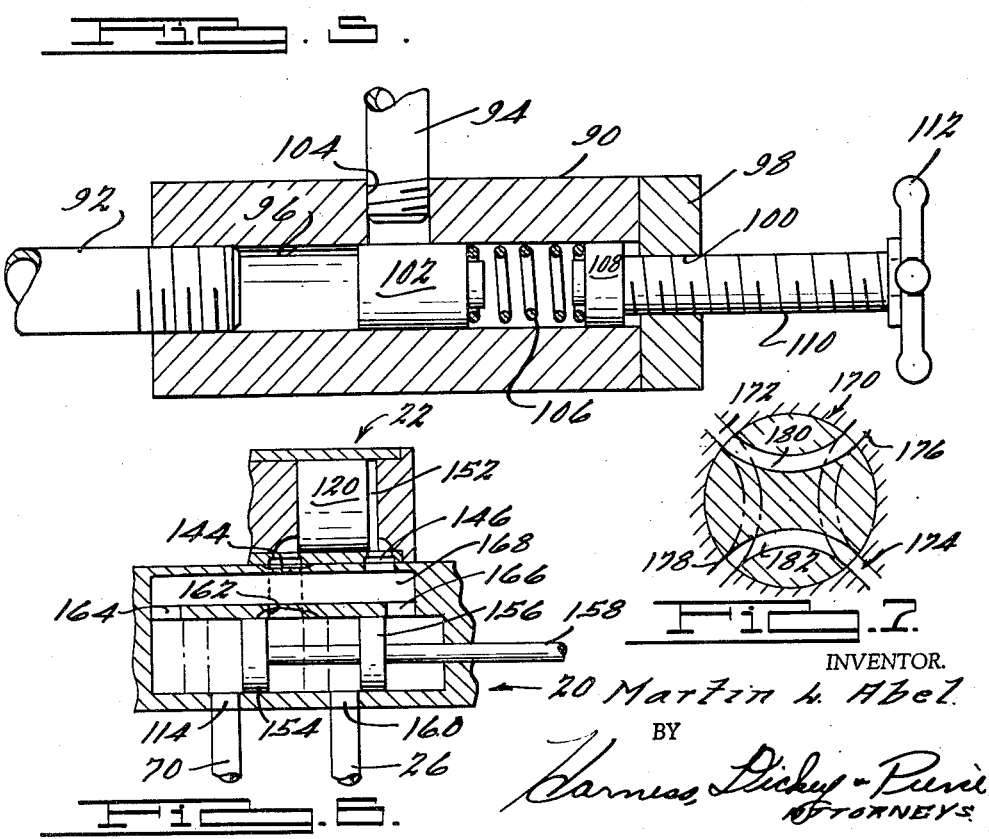

United States Patent Office 3,053,421
Patented Sept. 11, 1962

3,053,421
INJECTION MACHINES FOR WICKING MATERIAL
Martin L. Abel, Oak Park, Mich., assignor to Permawick Company, Inc., Detroit, Mich., a corporation of Michigan
Continuation of application Ser. No. 690,136, Oct. 14, 1957. This application May 31, 1960, Ser. No. 33,611
5 Claims. (Cl. 222—250)

The present invention relates to an improved injection machine and more particularly to one having improved means for accurately metering the quantity of material injected during operation of the machine, and is a continuation of Serial No. 690,136, filed October 14, 1957, now abandoned.

The present invention provides a machine designed to inject metered quantities of a lubricated wicking material comprised of small lengths of macerated wood fibers substantially all of which are approximately less than 3.5 millimeters in length. An example of such a lubricated wicking material is contained in my copending application Serial No. 686,638, filed September 27, 1957, now forfeited.

This macerated wicking material is mixed with and retains a large quantity of a suitable lubricating oil and is characterized by the fact that it can be injected under pressure through a small orifice in the injection nozzle of the machine and into a cavity surrounding a bearing element so as to lubricate the bearing element. An attempt was made to employ existing material handling equipment for feeding this wicking material from a hopper to the injection nozzle under pressure. However, after consulting with and trying the equipment of many of the leading material handling equipment companies, some of whom were of the opinion that their equipment could handle any lubricating material, it was found that existing equipment could not satisfactorily handle and pump this wicking material to the injection nozzle under pressure so that it could be injected from the nozzle.

Consequently, applicant was forced to invent his own machine for handling, pumping and injecting this wicking material. The problem involved in handling this wicking material is that it cannot be subjected to a pressure greater than that necessary to inject the material into the bearing cavity, and this condition must be met throughout the entire machine. If the pressure should build up at any point within the machine, it tends to vary the ratio of the lubricating oil to the wicking material at this point, and therefore, the wicking material injected from the machine will not have a uniform mixture. This variation cannot be tolerated since each of the bearing cavities must be filled with wicking material having substantially the same amount of lubricant retained thereby to ensure dependable lubrication of the bearings.

Further, the injection machine of the present invention also ensures that the lubricated wicking material moves through the machine in substantially continuous fashion to make certain that small amounts of wicking material do not build up or get trapped at certain points in the machine. If material should accumulate within a pipe, chamber or valve of the machine, the lubricating oil tends to leave the wicking material which then becomes hard and nonflowable and clogs the machine.

It is an object of the present invention to provide an improved injection machine of the above mentioned type which is adapted for use in injecting a lubricant impregnated wicking material in a relatively finely divided state.

It is another object of the present invention to provide an improved injection machine of the above mentioned type which can continuously pump a finely macerated lubricated wicking material therethrough under a predetermined pressure which is substantially uniform throughout the machine and inject the wicking material with a substantially uniform amount of lubricating oil mixed therewith.

It is a further object of the present invention to provide an improved injection machine of the above mentioned type which can pump the above mentioned lubricated wicking material continuously therethrough without trapping small amounts thereof within the machine.

It is a still further object of the present invention to provide an improved injection machine having readily adjustable means for controlling the quantity of the wicking material injected upon operation of the machine.

It is a still further object of the present invention to provide an improved injection machine of the above mentioned type which is simple in construction, reliable and efficient in operation, economical of manufacture, and which accurately controls the quantity of wicking material injected upon operation of the machine.

Other and more detailed objects of the present invention will be apparent from a consideration of the following specification, the appended claims and the drawings wherein:

FIGURE 1 is a perspective view of an injection machine embodying the present invention and in which a part of the housing is broken away to afford a view of the apparatus within the housing;

FIGURE 2 is a broken enlarged view partly in elevation and partly in section of the machine illustrated in FIGURE 1;

FIGURE 3 is a broken enlarged vertical sectional view of the hopper and the pump means;

FIGURE 4 is an enlarged transverse sectional view of the metering mechanism and a fragmentary portion of the valve mechanism controlling the flow to and from the metering mechanism;

FIGURE 5 is an enlarged transverse sectional view of the by-pass valve;

FIGURE 6 is a diagrammatic showing of the valve mechanism through which the material is supplied to the metering mechanism; and FIGURE 7 is a diagrammatic showing of the four-way air valve.

In the preferred embodiment of the present applicant's invention illustrated in the drawings, the present applicant's improved injection machine is illustrated as including a housing 10 supported on suitable casters 12 and upon which is mounted a hopper 14. The housing 10 houses a pump mechanism generally indicated at 16, driven by a motor 18 and which receives material from the hopper 14 as hereinafter described and delivers it under pressure to a valve mechanism 20 which, under the control of a metering mechanism 22 and an air cylinder 24, supplies material under pressure through the discharge line 26 to the injection nozzle 28. Operation of the injection machine is effected by suitable controls 30 and 32 mounted on the exterior of the hopper 14.

Referring to FIGURES 1, 2 and 3, the hopper 14 has an inclined bottom 34 which slopes inwardly to a downwardly extending cylindrical portion 36 which projects through an opening 38 provided in the top of the housing 10. The hopper is supported on the upper surface of the housing 10 by four outwardly extending webs 40 extending between the bottom 34 of the hopper 14 and the top of the housing 10. Within the downwardly extending cylindrical portion 36 of the hopper 14 is a vertically disposed auger 42 mounted on a shaft 44 extending downwardly into the housing 10 and into the pump mechanism 16 mounted in the housing 10 directly below the hopper 14. At its upper end the auger 42 carries an agitator rod 43 mounted thereon in any suitable manner for constantly agitating the material within the hopper during rotation of the auger 42.

The pump mechanism 16 includes an upper casting 46 having a sleeve bushing 48 in which the shaft 44 is journaled. The shaft 44 is driven through a worm gear 50 keyed thereto, which is in turn driven by a worm 52. The worm 52 has a shaft 54 extending outwardly through the pump mechanism casing 56 and carries a pulley 58 through which it is driven by the motor 18 through a conventional V-belt 60.

The casting 46 has a cylindrical pumping chamber 62 which is disposed at right angles to the shaft 44 and has an opening 64 spaced outwardly from its closer inner end 66 which communicates with the interior of the cylindrical portion 36 at the bottom of the hopper 14. The pumping chamber 62 also communicates with a transversely extending passage 68 which serves as the outlet of the pumping mechanism 16 and through which material is delivered under pressure to the material supply line 70 extending from the pump mechanism 16 to the valve mechanism 20. Disposed within the pumping chamber 62 is a piston 72 provided with a plurality of piston rings 74 spaced outwardly from the inner end of the piston so that in operation of the piston, these piston rings never become aligned with the opening 64. Reciprocation of the piston 72 is effected by a horizontally disposed crank 76 which is operated by an eccentric 78 keyed to the shaft 44. This crank is disposed within the casing 56 of the pump mechanism 16 between the worm gear 50 and the bushing 48 in the casing 46. At its outer end the crank 76 carries a pin 80 which projects upwardly through a slot 82 in the casing 46 into the pumping chamber 62 and through a vertical aperture 84 provided in the piston 72. It will be appreciated that as the inner end of the piston 72 moves under and closes the aperture 64, continued movement of the piston 72 positively forces material within the inner end of the pumping chamber 62 outwardly through the outlet passage 68. The lower end of the shaft 44 is journalled in a bearing 86 mounted in a cap 88 at the bottom of the casing 56.

To provide proper relief for the supply line 70 and maintain the pressure therein at a desired level, a by-pass is provided permitting material to return from the supply line 70 to the hopper 14. In the preferred embodiment illustrated, this by-pass comprises a by-pass valve 90, best illustrated in FIGURE 5, which is connected to the supply line 70 by conduit 92 and to the upper portion of the hopper 14 by a conduit 94. The by-pass valve 90 has a cylindrical chamber 96 communicating at one end with the conduit 92 and closed at its opposite end by a cover plate 98 having a threaded aperture 100 aligned with the cylindrical chamber 96. Disposed within the chamber 96 is a piston 102 which is urged to the position illustrated in FIGURE 5, in which it covers the opening 104 leading to the conduit 94. The piston 102 is urged to this position by a coil spring 106 disposed between the piston 102 and an abutment 108 mounted on the inner end of a threaded shaft 110 extending through the tapped opening 100 in the cover plate 98.

At its outer end the shaft 110 is provided with a handle 112, rotation of which adjusts the position of the abutment 108 and thereby varies the force which must be exerted upon the piston 102 to overcome the action of the spring 106 and permit material to flow from the conduit 92 through the by-pass valve 90 into the conduit 94 and thence to the hopper 14.

The supply line 70 is connected to one port 114 of a conventional four-way valve illustrated at 20, which is diagrammatically illustrated in FIGURE 6. From the supply line 70 material may pass through the valve 20 to the metering device 22 which is shown in cross section in FIGURE 4. In the preferred embodiment there illustrated, this metering device comprises a body 116 having a cylindrical bore 118 extending longitudinally therethrough. Within the cylindrical bore 118 is a piston 120 provided with piston rings 122 and movable between a fixed stop provided by the end wall 124 closing one end of the bore 118 and an adjustable stop 126 fitted within the bore 118 and adjustable therealong by a screw 128. A head 130 of the screw 128 is fitted in a recess in the stop 126 and held against withdrawal therefrom by a snap ring 132 and provided at its outer end with a hexagonal head 134. The stop 126 is held against rotation with the screw 128 by a pin or key 136 extending through the end plate 138 in which the screw 128 is mounted and projecting into aligned recesses 140 and 142 provided in the body 116 and the abutment 126, respectively. The body 116 is provided with ports 144 and 146 disposed as illustrated in FIGURE 4 and communicating with the bore 118, the port 146 being disposed adjacent to and in overlapping relation with the end plate 124 which is relieved as indicated at 148, so that pressure applied through the port 146 may act against at least a part of the adjacent face of the piston 120 even though the piston 120 may be against the abutment provided by the end plate 124. Similarly, the port 144 is disposed adjacent to and overlaps a part of the abutment 126 in all positions of adjustment thereof, and the abutment 126 is relieved as indicated at 150 so that pressure may be applied through the port 144 to at least a portion of the adjacent face of the piston 120, even though the piston 120 may be disposed against the abutment 126.

It will now be appreciated that the piston 120, when disposed in the position illustrated in FIGURE 4, cooperates with the body 116 and the end plate 124 to define a cylindrical metering chamber 152 at the right-hand side of the piston 120 as there illustrated. When the piston 120 is moved to the right from the position illustrated in FIGURE 4, to a position in which further movement is prevented by the end plate 124, the piston 120 then cooperates with the body 116 and the stop 126 to define a metering chamber at the opposite side of the piston 120 and this chamber will be of exactly the same size as the metering chamber 152. It will also be appreciated that the size of both of these chambers may be simultaneously adjusted by movement of the abutment 126 by means of the adjusting screw 128.

Referring to FIGURE 6, in which the valve mechanism 20 is diagrammatically illustrated, the valve mechanism is shown to include a spool valve having spaced pistons 154 and 156 mounted on a valve rod 158 and movable between the position illustrated in full lines and the position illustrated in broken lines in FIGURE 6. The valve mechanism 20, in addition to the port 114 communicating with the supply line 70, has a port 160 communicating with the discharge line 26, a port 162 communicating with the port 144 of the metering mechanism and a pair of ports 164 and 166 connected by a manifold line 168 to the port 146 of the metering mechanism. It will now be appreciated that with the spool valve in the position illustrated in full lines, material from the supply line 70 may move through the port 114 into the valve body and out through the port 164, the line 168 and into the metering chamber 152 of the metering mechanism 22 through the port 146. This forces the metering piston 120 to move to the position shown in full lines and forces material from the metering chamber at the opposite end of the metering mechanism through the port 144 and the port 162 to which it is connected, through the valve mechanism 20 and out the port 160 connected to the discharge line 26. Similarly, it will be appreciated that when the spool valve is in the position illustrated in broken lines, material from the supply line 70 may pass through the valve 20 by way of the ports 114 and 162 into the metering mechanism through the port 144 forming the piston 120 thereof to the right and forcing material from the metering chamber 152 outwardly through the port 146 and through the valve mechanism 20 by way of the manifold line 168, the port 166 and the port 160 and into the discharge line 26.

Operation of the shaft 158 of the valve mechanism 20 is effected by means of the air cylinder 24. Air pressure is selectively supplied to opposite ends of the air cylinder 24 by means of a conventional solenoid operated four-way air valve 170 through lines 172 and 174. Air pressure is supplied to the valve 170 from a source not shown, by suitable connection to the line 176. The valve 170 is also provided with a vent represented at 178. The air valve 170 is diagrammatically illustrated in FIGURE 7 and incudes passages 180 and 182, one of which connects the air supply line 176 to one end of the air cylinder 24 through one of the lines 172 and 174, while the other of the passages 180 and 182 connects the opposite end of the air cylinder 24 to the vent 178.

To operate the applicant's improved injection machine, the push button switch 30 is pushed to start the motor 18, a suitable amount of the lubricant impregnated material having been placed in the hopper 14. After a short initial period of operation, during which the operation of the pump mechanism 16 fills the supply line 70 and the passages in the valve mechanism 20 and the metering mechanism 22 to which it is connected, the solenoid operated air valve 170 is moved by controls provided on the control panel 32 to supply air pressure to the opposite end of the air cylinder 24. This moves the shaft 158 and the spool valve carried thereby of the valve mechanism 20 and supplies material under pressure to one of the metering chambers as described above, and forces material from the other metering chamber out through the discharge line 26 and out through the injection nozzle 28. The pressure at which the material is discharged from the injection nozzle 28 may be controlled by varying the pressure within the supply line 70 by manual operation of the handle 112 of the by-pass valve 90.

In FIGURE 2 of the drawings an electric motor 184 is shown disposed with its bearing 186 fitted over the injection nozzle 28 so that upon operation of the air valve 170 from the control panel 32, the lubricant impregnated material is forced from one of the metering chambers of the metering mechanism 22 out through the discharge line 26 and the injection nozzle 28 into the bearing 186 of the motor 184. The amount of material discharged from the injection nozzle 28 may be accurately controlled by turning the hexagonal head 134 projecting outwardly from the metering mechanism 22. As described above, this effects rotation of the screw 128 and movement of the abutment 126, thereby simultaneously adjusting the size of both of the metering chambers at opposite ends of the metering piston 120.

The maximum pressure that is exerted on the lubricant impregnated wicking material is determined by the bypass valve 90 which is set so as to provide just enough pressure in the machine to inject the wicking material from the injection nozzle 28 with sufficient pressure to make certain that it completely fills the cavity surrounding the bearing 186 of the motor 184. If desired, the valve 90 can be eliminated and the conduit 94 reduced in diameter so that the smaller diameter of the conduit 94 acts as a constriction and requires a predetermined pressure to be exerted on the wicking material to cause it to flow therethrough. Consequently, if the pressure within the conduit 70 or valve 20 or other portions of the machine exceeds this predetermined pressure the wicking material will simply pass through the conduit 94 and back into the hopper. When the augur 42 delivers more wicking material than is required, this excess material will also recirculate through the conduit 94 and back into the hopper.

Referring to FIG. 3, it will also be observed that the pumping chamber 62 is located directly adjacent to the lower end of the auger 42 and that the aperture 64 has a relatively short length equal to the thickness of the wall of the pumping chamber. Consequently, the wicking material moves directly from the auger to the pumping chamber with no extra space for material to accumulate. In many prior art injection machines the auger delivers material to an enlarged chamber which acts as somewhat of a reservoir from which the wicking material is supplied to the pump mechanism. In attempting to use prior art injection machines of this type applicant found that the macerated wicking material built up and remained in the reservoir chamber, and the oil tended to separate from this material that did not pass through the machine and interfered with the flow of the remaining wicking material through the machine.

Referring to FIG. 6, it will also be observed that as the spool valve is shifted to the left from the position illustrated in solid lines to the position illustrated in phantom, the wicking material will be forced through the manifold line 168 and out through the port 166 into the space adjacent to the right end of the piston 156. This keeps the wicking material circulating through the manifold line so that an exchange of material takes place. When the piston 120 is shifted to the right, it will be observed that the wicking material will be forced downwardly through the port 146 to force wicking material from the right end of the manifold 168 through the port 166 which, in turn, causes wicking material to move under pressure through the outlet conduit 26. When the spool again shifts to the right from the phantom position to the position indicated in solid lines, the wicking material will be moved through the manifold in a left hand direction and through the port 164 into the space adjacent to the piston 154. However, a portion of the wicking material in the manifold will flow into the space adjacent to the right end of the piston and force it to the left. Thus, a constant exchange of wicking material is always taking place to make certain that a small amount of the material is not trapped in the manifold for a prolonged period of time.

Many of the prior art injection machines tried by applicant had valve arrangements or conduit arrangements wherein small amounts of the wicking material would remain trapped in a valve or pipe and be shifted back and forth for prolonged periods in a manner to pump other wicking material through the machine. When this occurred the back and forth shifting separated the lubricating oil and the wicking material tended to set up much like cement and become nonflowable so as to completely block the flow of wicking material through the machine. An example of such a prior art construction can be found in the patent to Meyers 2,352,490, issued on June 27, 1944.

It is apparent that the valve 20 and metering mechanism 22 of the present invention are designed to eliminate the possibility of small amounts of wicking material becoming trapped adjacent to the left and right ends of the metering piston 120. As previously described an exchange of material constantly takes place in the manifold 168, and the volume of the short conduit connecting the ports 144 and 162 is significantly smaller than the volume of the space adjacent to the left end of the metering piston 120 to ensure that an exchange of wicking material constantly takes place in the short conduit.

From the foregoing, it will be appreciated that the injection machine of the present invention will continuously pass the wicking material from the hopper out through the injection nozzle without varying the mixture of the wicking material since the pressure at all points within the injection machine can never be greater than the pressure required to force the wicking material through the conduit 94 and back into the hopper. Further, small amounts of the wicking material cannot be trapped at any point within the machine for prolonged periods to impede the flow of the remainder of the wicking material through the machine.

While only one specific embodiment of the present invention has been illustrated and described in detail herein, it will be readily appreciated by those skilled in the art that numerous modifications and changes may be made without departing from the spirit of the present invention.

What is claimed is:

1. An injection machine for injecting a predetermined quantity of a lubricant-impregnated wicking material comprising an unrestricted supply line, hopper means communicating with one end of said supply line for storing and continuously forcing said material through said supply line under pressure, positive displacement pump means periodically interrupting the flow of material from said hopper means and positively advancing all of said material in said supply line, bypass means communicating said supply line intermediate the ends thereof directly with said hopper means, said bypass means including means for imposing a predetermined back pressure on said material while enabling all material that enters said bypass means to progressively pass therethrough back into said hopper means, and discharge means connected to the other end of said supply line for discharging predetermined quantities of said material in response to the pressure of said supply line without increasing the pressure on said material.

2. The invention as defined in claim 1 wherein said discharge means comprises a single discharge outlet, a cylinder having a free floating piston therein, and valve means movable between first and second positions, said valve means in said first position communicating said supply line with the cylinder on one side of said piston and said discharge outlet with the cylinder on the other side of said piston, when in said second position said valve means communicating the cylinder on said other side of the piston with said supply line and the cylinder on said one side of the piston with said discharge outlet, said valve means progressively passing all of said material therethrough without increasing the pressure on the material.

3. The invention as defined in claim 2 wherein said valve means comprises a spool valve having a pair of axially spaced annular lands defining an annular chamber therebetween and first and second chambers axially outwardly of each of said lands, said annular chamber communicating said supply line with said one side of said piston and said first chamber communicating said discharge outlet with said other side of the piston when the valve is in said first position, said annular chamber communicating said discharge outlet with said one side of the piston and said second chamber communicating said supply line with said other side of the piston when said valve is in said second position, and passageway means communicating said first and second chambers to enable said material to flow therebetween in response to the shifting of the spool so as to prevent pressure from increasing within the valve when the spool is shifted.

4. An injection machine for injecting a predetermined quantity of a lubricant-impregnated wicking material comprising means for maintaining a supply of said material at a predetermined pressure, a single discharge outlet, metering means having a free floating piston with first and second variable chambers on opposite sides thereof, and valve means shiftable between a first and second position, when in said first position said valve means communicating said supply with said first chamber and communicating said second chamber with said discharge outlet, when in said second position said valve means communicating said supply with said second chamber and communicating said first chamber with said discharge outlet, said valve means being of the positive displacement spool type and including a passageway therein to enable the lubricant-impregnated wicking material to shift from one side of the spool to the other in response to the shifting of the valve between said first and second positions to prevent an increase of pressure within the valve due to the shifting of the spool.

5. The invention as defined in claim 4 wherein said valve means comprises a spool having a pair of axially spaced annular lands defining an annular recess therebetween and first and second recesses axially outwardly of each of said lands, said annular recess communicating said supply with said first chamber and said first recess communicating said discharge outlet with said second chamber when the valve is in said first position, said annular recess communicating said discharge outlet with said first chamber and said second recess communicating said supply with said second chamber when said valve is in said second position, and passageway means communicating said first and second recesses to enable said material to flow therebetween in response to the shifting of the spool so as to prevent pressure from increasing within the valve when the spool is shifted.

References Cited in the file of this patent
UNITED STATES PATENTS

| | | |
|---|---|---|
| 1,393,856 | Upright | Oct. 18, 1921 |
| 1,720,398 | Harrigan | July 9, 1929 |
| 1,859,290 | Davis | May 24, 1932 |
| 1,875,745 | Marland et al. | Sept. 6, 1932 |
| 2,352,490 | Meyers | June 27, 1944 |
| 2,427,755 | Wedeberg | Sept. 23, 1947 |
| 2,731,173 | Harrigan | Jan. 17, 1956 |